J. W. Thyng.
Coffee Maker.
Nº 72429. Patented Dec. 17, 1867.
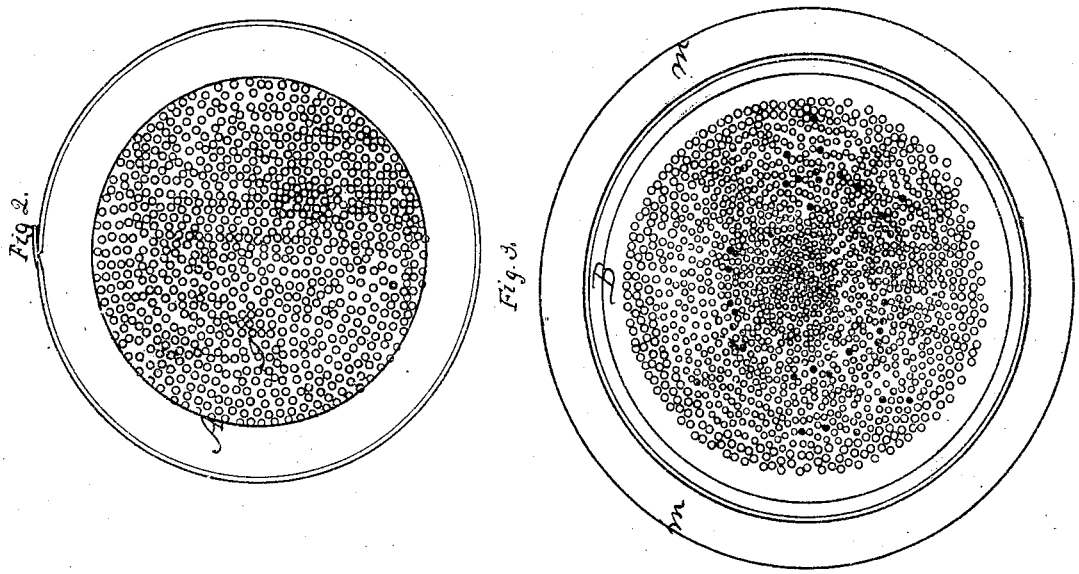
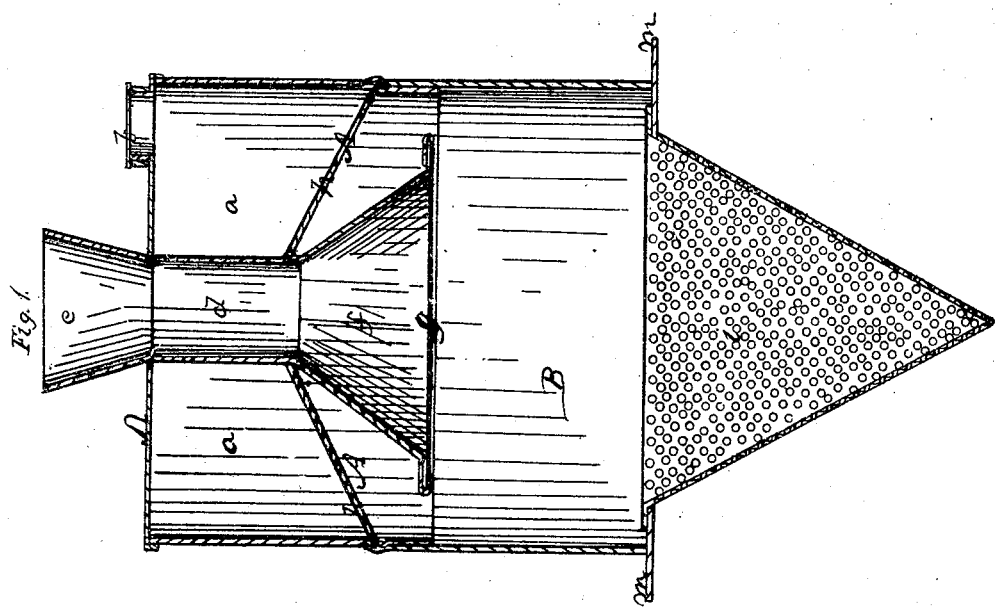
Witnesses:—
E. J. Brown.
R. D. O. Smith.
J. W. Thyng.
By his atty.
J. S. Brown.

United States Patent Office.

J. WARREN THYNG, OF SALEM, MASSACHUSETTS.

*Letters Patent No. 72,429, dated December 17, 1867.*

COFFEE-MAKER.

*The Schedule referred to in these Letters Patent and making part of the same.*

TO ALL WHOM IT MAY CONCERN:

Be it known that I, J. WARREN THYNG, of Salem, in the county of Essex, and State of Massachusetts, have invented an Improved Coffee-Maker; and I do hereby declare that the following is a full and exact description thereof, reference being had to the accompanying drawings, making part of this specification—

Figure 1 being a central vertical section of the apparatus,

Figure 2 a bottom view of the upper part or condenser thereof, and

Figure 3 a top view of the lower part or receptacle thereof.

Like letters designate corresponding parts in all of the figures.

My invention is an apparatus to be placed in the mouth of an ordinary coffee-pot, and consists of two parts, the condenser, A, and the receptacle, B. The former fits into the top of the latter, as shown, and the receptacle is placed in the mouth of the coffee-pot. A projecting flange, $m$, may be employed, to rest on the top of the coffee-pot, being thus extended so that it will fit different sizes of mouths, and still close them and rest upon the coffee-pots.

In the bottom of the receptacle B is situated an inverted cone, $i$, made of perforated tin, wire gauze, or equivalent material. This is to receive the ground coffee, and to act as a strainer, to prevent the particles of the berry from going through with the extract. I find it best to use a thickness or two of cloth, preferably flannel, inside of the perforated cone, to more effectually prevent the fine particles of the berry from passing through. This is not absolutely necessary; but it makes clearer coffee, and I would recommend its use.

After the ground coffee has been placed in the receptacle B, the condenser A is fitted over or in the said receptacle, for the purpose of passing the hot water through the coffee into the coffee-pot. The condenser is made substantially as represented, having a cold-water chamber, $a$, with a mouth, $b$, closed by a stopper, for the introduction of the cold water; a funnel, $c$, projecting above the condenser in the middle; a passage, $d$, leading from the funnel down through the cold-water chamber, and communicating with a flaring or conical chamber, $f$, whose broad mouth, at the bottom, is covered by a sheet, $g$, of perforated tin plate or wire gauze. The bottom, $h$, of the cold-water chamber $a$, is also, best, of conical form, substantially as shown.

The two parts of the apparatus, thus constructed and put together, substantially as above set forth, their use is simple. After the chamber $a$ is filled with cold water, the boiling water for the coffee is gradually poured into the funnel $c$, and, as it passes from the conical chamber $f$ below, it is scattered by the perforated plate $g$, and distributed, in small streams or spray, evenly over the coffee in the receptacle B below, thus gradually extracting the virtue of the coffee equally from all parts. The volatile aroma of the coffee, as it rises, is again mostly met by the descending spray of hot water, since the plate $g$ covers nearly the whole interior space of the condenser. What little ascends above the conical chamber $f$ is condensed on the bottom, $h$, of the cold-water chamber $a$, and, with the condensed steam, is precipitated down into the receptacle, and saved. As soon as all the boiling water has passed through the apparatus, the beverage is ready for use.

The exact construction above described need not be adhered to, provided it produces corresponding effect in substantially the same way. The apparatus may be employed, with excellent results, for making or drawing tea.

What I claim as my invention, and desire to secure by Letters Patent, is—

1. The conical distributing-chamber $f$, arranged under the condenser, substantially as and for the purpose herein specified.

2. I also claim the inverted perforated cone $i$, in the bottom of the receptacle B, in combination with the distributing-chamber $f$, substantially as and for the purpose specified.

3. I also claim the extended flange $m$, on the receptacle, for the purpose specified.

4. I also claim the combination of the condenser A, constructed substantially as described, with the receptacle B, constructed substantially as set forth.

The above specification of my improved coffee-maker signed by me, this eleventh day of May, 1867.

J. WARREN THYNG.

Witnesses:
SAMUEL H. QUINCY,
GEORGE B. THYNG.